United States Patent [19]

Ushiro

[11] Patent Number: 4,511,932
[45] Date of Patent: Apr. 16, 1985

[54] VIDEO RECORDING CAMERA

[75] Inventor: Tatsuzo Ushiro, Tokyo, Japan

[73] Assignee: Canon Kabushiki Kaisha, Tokyo, Japan

[21] Appl. No.: 388,248

[22] Filed: Jun. 14, 1982

[30] Foreign Application Priority Data

Jun. 24, 1981 [JP] Japan .................................. 56-97916

[51] Int. Cl.³ .......................... H04N 5/78; H04N 5/91; H04N 5/26
[52] U.S. Cl. .................................. 360/33.1; 358/227; 358/906; 358/335
[58] Field of Search ...................................... 358/41–50, 358/209, 217, 227, 310, 311, 335, 906; 360/33.1, 14.1–14.3, 35.1, 79, 96.1; 354/25

[56] References Cited

U.S. PATENT DOCUMENTS

| | | | |
|---|---|---|---|
| 3,285,612 | 11/1966 | Hallamore | 360/96.1 |
| 3,435,136 | 3/1969 | Bachmann et al. | 358/227 X |
| 3,974,522 | 8/1976 | Fukatsu et al. | 358/906 X |
| 4,363,051 | 12/1982 | Maeda et al. | 358/335 X |
| 4,400,743 | 8/1983 | Takimoto et al. | 358/906 X |

Primary Examiner—Aristotelis M. Psitos
Attorney, Agent, or Firm—Toren, McGeady and Stanger

[57] ABSTRACT

A picture recording apparatus having an image pick up means, in which the drive of a picture signal recording medium is effected by means of a driving power producing means for producing the driving power for moving at least a part of the photographing lens included in the image pick up means.

17 Claims, 3 Drawing Figures

VIDEO RECORDING CAMERA

BACKGROUND OF THE INVENTION

1. Field of the Invention

The present invention relates to a picture recording apparatus, particularly consisting of a camera part producing a picture signal and a recording part recording a picture signal on a recording medium.

2. Description of the Prior Art

Below in the present specification a video tape recorder (hereinafter called VTR) using a magnetic tape as the recording medium and incorporated with a video camera is described by way of example.

Until now, in order to find where the desired scene is recorded in the tape recorded in VTR, the so called high speed search mechanism has been proposed, which feeds the picture quickly by feeding the tape in the picture reproducing mode at high speed.

However, in case the tape is fed at high speed when the above high speed search mechanism is used or the quick feeding or the quick rewinding is carried out, the tape reel is driven at high speed so that an additional exclusive motor for feeding the tape at high speed is needed, which makes an obstacle for the realization of a compact and light VTR.

Particularly, in case of the VTR incorporated with a video camera motors are needed for the focus adjusting mechanism or the photographing magnification factor converting mechanism. Consequently, despite the demand for realization of a compact and light VTR has been large, the realization is difficult.

SUMMARY OF THE INVENTION

It is an object of the present invention to provide a compact and light picture recording apparatus of a simple construction having an image pick up means.

Further, the present invention is characterized in that the recording medium can be driven by means of a driving power producing means capable of driving at least a part of the image pick up means of the picture recording apparatus.

DETAILED DESCRIPTION OF THE PREFERRED EMBODIMENT

Below the present invention will be explained in accordance with the embodiment of the present invention.

Figure 1:
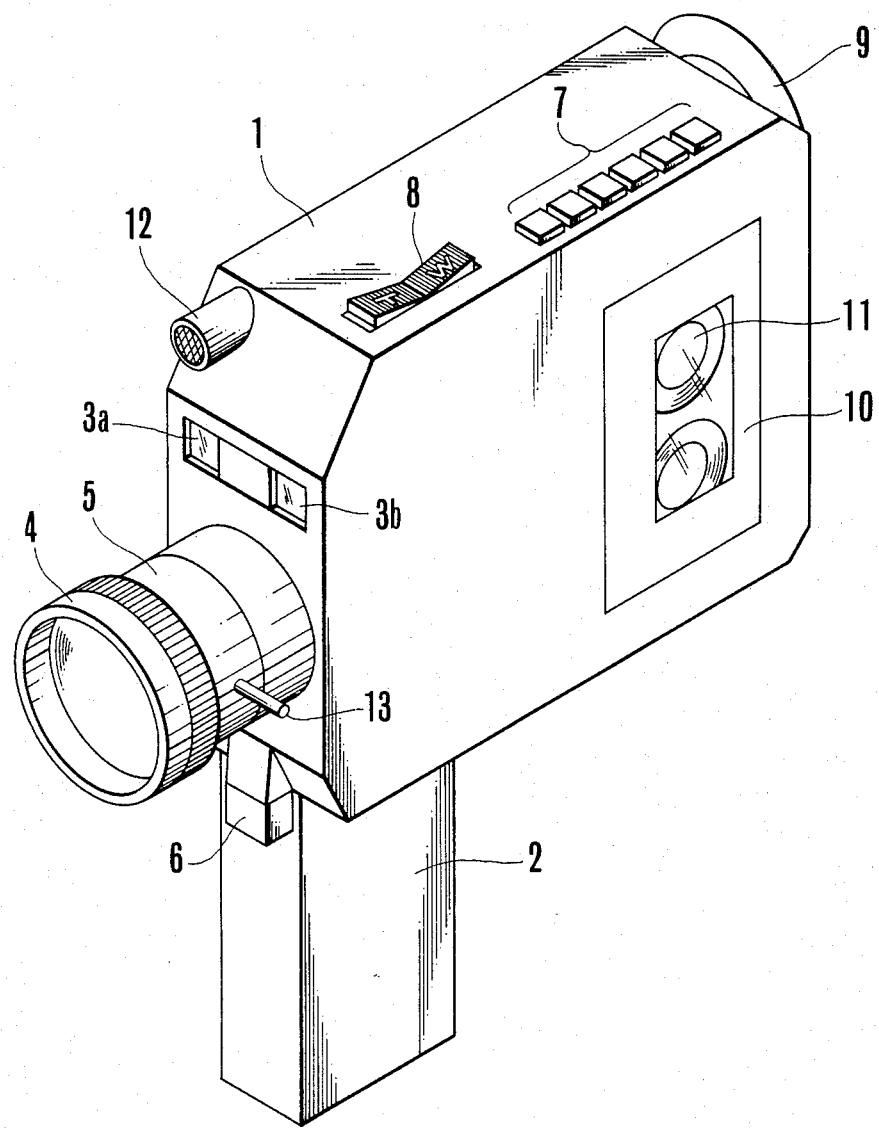
FIG. 1 shows an embodiment of the picture recording apparatus of the present invention in perspective view.

FIG. 1 shows an embodiment of the VTR with built-in camera of the present invention in perspective view.

Figure 2:
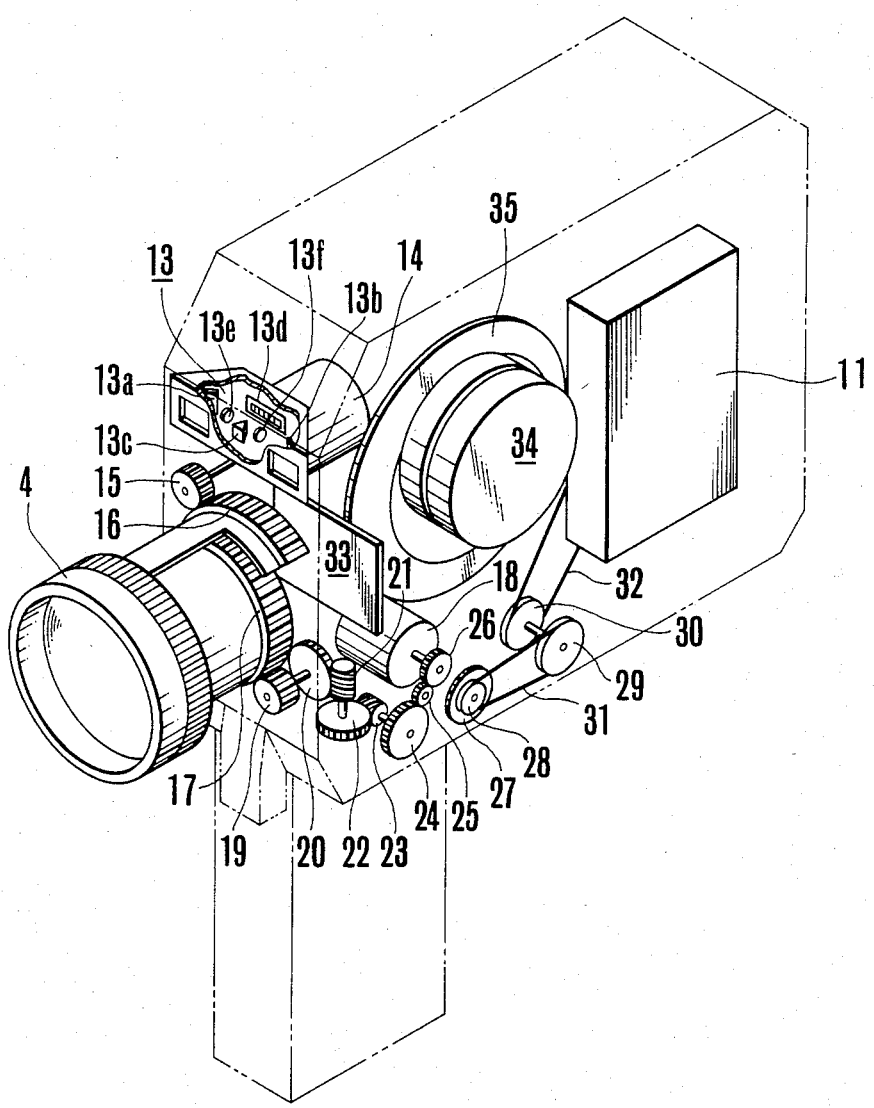
FIG. 2 shows the important part of an embodiment of the picture recording apparatus of the present invention.

1 is the frame of the main body, while 2 is the grip mountable on the frame 1 with the not shown connector. 3a and 3b are the windows for the distance measuring device in FIg. 2 for measuring the distance between the object and the image pick up plane. 4 is the ring for manual focusing, 5 is the ring for manual zooming and 13 is the zooming pin arranged on the ring 5. 6 is the release button arranged on the frame of the main body. 7 is the operation button group. 8 is the zoom button having (T) button for telephoto and (W) button for wide angle. 9 is the eye cap for the not shown view finder. 10 is the cover for the chamber for loading the cassette tape and 12 is the microphone.

FIG. 2 shows the important part of the above embodiment.

13 is the distance measuring device so designed that the light beams incident through the above windows 3a and 3b are led to the prism 13c with the mirrors 13a and 13b and further to the image sensor 13d with the two totally reflecting surfaces of the prism. 13e and 13f are the image forming lenses provided in the respective optical path so as to measure the distance up to the object with the relative position of the two images on the sensor 13d.

14 is the focus motor for driving the focus ring 4 via the gears 15 and 16.

Hereby, the methods for controlling the focus motor 14 in accordance with the measured distance up to the object have have been disclosed in detail in U.S. Pat. Nos. 4,178,098, and 4,189,232 and so on.

18 is the zooming motor reversible with the above zoom button 8 for carrying out the zoom operation by driving the zoom lens driving gear 17 via the gears 26, 25, 24, 23, 22, 21, 20 and 19 as the first transmission means. 33 is the image pick up plate, 34 is the rotary head drum for recording the picture signal and 35 is the loading ring for driving the pin for pulling out the tape out of the cassette 11. The tape is led to the drum 34 with the rolling ring 35 in such a manner that the picture signal is recorded on the magnetic tape with the recording means including the recording circuit and the corresponding servo circuit and so on.

27 is the gear for receiving the driving power from the gear provided on the shaft of the above motor 18 via the above gear 25. 28 is the pulley connected coaxially to the gear 27 and 29 is the pulley driven with the pulley 28 via the belt. 30 is the pulley connected coaxially with the pulley 29 and capable of driving the tape pulley to be explained later via the belt 32.

Figure 3:
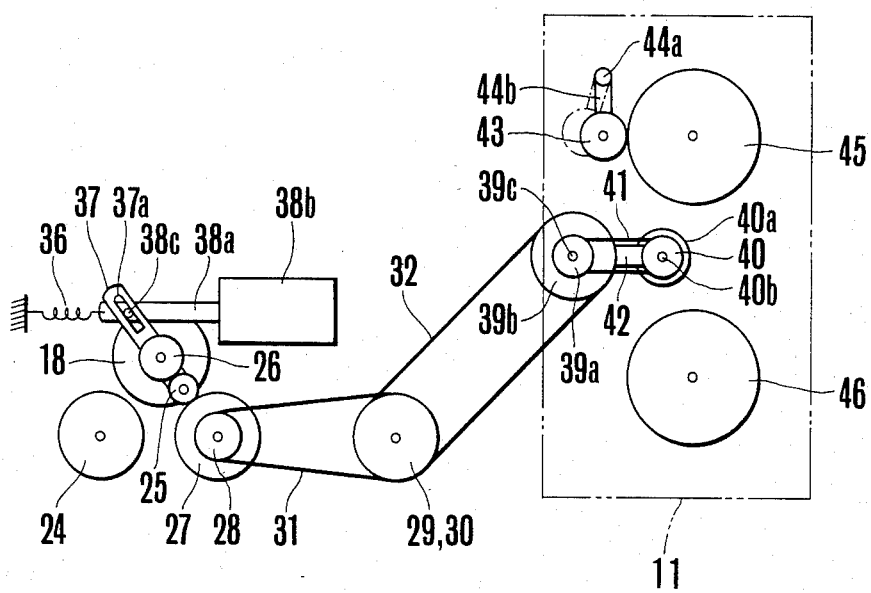
FIG. 3 shows the reel driving part of an embodiment of the picture recording apparatus of the present invention.

FIG. 3 shows the driving part of the reel in the cassette 11 on which the tape is wound, the transmission mechanism as the second transmission means for transmitting the rotation power of the motor 18 to the reel driving part and the change over mechanism as the control means of the transmission. In the drawing, the members having the same figures as those in FIG. 1 and FIG. 2 are the same members.

38a is the core and 38b is the solenoid for driving the core, which attracts the core 38a toward the right in the drawing when supplied with the current and lets the core 38a move to the left in the drawing by the strength of the spring 36 as is shown in FIG. 3 when the current supply is interrupted.

The core 38a is provided with a pin 38c, which is engaged in the long groove 37a in the lever 37 freely engaged on the shaft of the motor 18.

Further, the above gear 25 is rotatably born on the lever 37 so as to transfer the driving power of the motor 18 to the gear 24 or the gear 27 in accordance with the rotation of the lever 37.

Further, 39b is the pulley driven with the above belt and 39a is the pulley connected to the shaft 39c of the pulley 39b so as to drive the pulley 40 via the belt 41.

40a is the gear connected coaxially to the shaft 40b of the pulley. Further, the shaft 40b is arranged on a part of the lever 42 whose one end is rotatably born on the above shaft 39c.

45 and 46 are respectively the rewinding reel drive stand and the feeding reel drive stand. 43 is the gear receiving the driving power for example from the capstan so as to drive the rewinding reel stand 45, being rotatably born on the shaft provided on the lever 44b. The lever 44b is rotatably born on the shaft 44a, being operatively engaged with the not shown mechanism so as to engage the gear with the reel driving stand 45.

Below, the operation of the mechanism shown in FIG. 3 will be explained. At the time of recording the current is supplied to the solenoid shown with 38b from the not shown circuit so as to attract the pin 38c to the right in the drawing against the strength of the spring 36. Thus, the lever 37 rotates clockwise so that the gear 25 is engaged with the gear 24 in such a manner that the rotating power of the motor 18 is transmitted to the above zoom driving mechanism after the gear 24. At the time of the reproduction no current is supplied to the coil 38b and the gear 25 is connected to the gear 27 with the spring 38. The rotation power transmitted to the gear 27 is transmitted to the gear 49a via the pulleys 28, 29, 30, 39b, 39a and 40, and the belts 31, 32 and 41. In case the tape is fed at the normal speed, the rotation power is transmitted to the gear 43 from the not shown separate driving source, for example, the capstan so as to transmit the rotation power to the rewinding reel drive stand 45 and rewind the tape at the normal speed. At the time of the high speed searching the lever 44b is rotated counterclockwise around the shaft 44a so that the gear 43 is disengaged from the rewinding reel drive stand 45. Then, along with the translation of 42 rotating around the shaft of the pulleys 39a and 39b with the separate control means including the not shown solenoid and so on, the gear 40a is connected to the rewinding reel drive stand or the feeding reel drive stand 46 so as to transmit the rotation power of the motor 18 and feed the tape at high speed.

Hereby, the change over of the lever 42 can be manually made or by making use of the satelite gear the transmission way can be changed over in accordance with the rotation direction of itself.

Further, although in case of the embodiment shown in FIGS. 1 to 3, the zooming motor is used, being changed over, for driving the reel stand, it goes without saying that the focus motor 14 can be used, being changed over.

Further, the solenoid for controlling the change over of the gears 25, 40a and so on can be replaced with a permanent magnet so as to economize the power. Further, it is possible that the zooming motor 18 or the focus motor 14 is used for the quick feeding and the rewinding, without using the high speed search mechanism.

In accordance with the above-mentioned embodiment of VTR of the present invention, the number of the motors can be reduced by rotating the rewinding reel drive stand or the feeding reel drive stand with the zooming motor 18 or the focus motor 14. Consequently, the compact and light VTR with built-in camera can be obtained.

Hereby, in the present embodiment of the present invention is applied to VTR using a magnetic tape as recording medium and having a built-in camera. However, the present invention can of course be applied not only to the above VTR but also the picture signal recording apparatus having a picture pick up means. For example, the recording means cannot necessarily be the magnetic tape but other medium such as magnetic sheet and so on.

As so far explained in accordance with the embodiment, in accordance with the present invention, the compact and light picture recording apparatus can be obtained with a simple construction.

What is claimed is:

1. A video recording camera comprising:
   image pick up means including a picture taking lens having at least one part;
   recording means for recording a video signal obtained with the image pick up means on a recording medium;
   a motor for producing motive power;
   running means for running the recording medium with the motive power from the motor; and
   selectively transmitting means for selectively transmitting the motive power from the motor to the lens and to the running means.

2. A video recording camera according to claim 1, wherein the lens includes a zooming mechanism for effecting zooming, and wherein the transmitting means is arranged to selectively transmit the motive power from the motor to said zooming mechanism.

3. A video recording camera according to claim 1, wherein the lens includes a focus adjusting mechanism, and wherein said transmitting means is arranged to selectively transmit the motive power from the motor to the focus adjusting mechanism.

4. A video recording camera comprising:
   image pick up means including an image-forming lens assembly having a plurality of parts;
   a motor for producing motive power;
   running means for running a recording medium;
   recording means for recording a video signal on the recording medium;
   first transmission means for transmitting motive power of the motor to at least a part of the lens assembly;
   second transmission means for transmitting the motive power of the motor to said running means; and
   control means for controlling the transmission of the motive power from the motor by the first and the second transmission means.

5. A video recording camera according to claim 4, wherein the control means is arranged to control the second transmission means in such a manner that the motive power of the motor is transmitted to the running means to run the recording medium at high speed.

6. A video recording camera according to claim 4, wherein the control means is arranged to control said first transmission means in such a manner that the motive power of the motor is transmitted to the part of the lens assembly when the recording means records the video signal from the image pick up means.

7. A video recording camera according to claim 4, wherein the control means has a solenoid and an iron core and controls said first and second transmission means with the movement of the iron core in response to current to the solenoid.

8. A video recording camera according to claim 4, wherein the lens assembly includes a zoom mechanism for effecting zooming, and wherein said first transmission means is arranged to transmit the motive power of the motor to the zoom mechanism.

9. A video recording camera according to claim 4, wherein the lens assembly includes a focus adjusting mechanism, and wherein the first transmission means is arranged to transmit the motive power of the motor to the focus adjusting mechanism.

10. A video recording system according to claim 4, wherein the recording medium is a magnetic tape.

11. A video recording camera according to claim 10, wherein the running means includes a tape reel drive member for rotating a reel on which the magnetic tape is wound.

12. A video recording camera comprising:
image pick up means including;
a motor for producing motive power;
recording means for recording a video signal on a magnetic tape;
first transmission means for transmitting the motive power of the motor to the optical system;
first running means for running the magnetic tape at a first speed;
second running means for running the magnetic tape when the recording means records video signals on the magnetic tape at a second speed lower than the first speed;
second transmission means for transmitting the motive power of the motor to the first moving means; and
control means for controlling the first and the second transmission means so that the motive power from the motor is selectively transmitted to the optical system and to the first running means.

13. A video recording camera according to claim 12, wherein the control means includes a solenoid and an iron core and controls the first and second transmission means with the movement of the iron core in response to current to the solenoid.

14. A video recording camera according to claim 12, wherein the optical system includes a zoom mechanism for effecting zooming, and wherein the first transmission means is arranged to transmit the motive power of the motor to the zoom mechanism.

15. A video recording camera according to claim 12, wherein the optical system includes the focus adjusting mechanism and wherein the first transmission means is arranged to transmit the motive power of the motor to the focus adjusting mechanism.

16. A video recording camera comprising:
image pick up means including a picture taking lens;
recording means for recording a video signal obtained with the image pick up means on a recording medium;
a motor for producing motive power;
moving means for moving the relative position of the recording medium and the recording means by using the motive power from the motor so as to change the recording position of the video signal on the recording medium; and
selective transmitting means for selectively transmitting the motive power from the motor to a part of the lens and to the running means.

17. A video recording camera comprising:
image pick up means including an image forming lens assembly;
recording means for recording a video signal on the recording medium;
a motor for producing motive power;
moving means for moving the relative position of the recording medium and the recording means by using the motive power from the motor so as to change the recording position of the video signal on the recording medium;
first transmission means for transmitting the motive power from the motor at lest to a part of the lens assembly;
second transmission means for transmitting the motive power from the motor to said moving means; and
control means for controlling the transmission of the motive power from the motor by the first and second transmission means.

* * * * *